United States Patent

Larson

[15] 3,638,691
[45] Feb. 1, 1972

[54] POSITIONING SYSTEM WITH BUMPER RECEDING FROM STOPPED POSITION

[72] Inventor: Robert A. Larson, L'anse, Mich.
[73] Assignee: Pettibone Corporation, Chicago, Ill.
[22] Filed: Feb. 9, 1970
[21] Appl. No.: 9,612

[52] U.S. Cl. .............................. 143/46 F, 83/212, 83/391, 143/157 F, 143/168 C
[51] Int. Cl. ............................... B27b 5/02, B27b 31/00
[58] Field of Search ................... 83/210, 212, 268, 391, 467; 143/46, 46 F, 168, 168 C, 157 F; 144/3 B, 3 C, 3 D

[56] References Cited

UNITED STATES PATENTS

| | | |
|---|---|---|
| 2,766,783 | 10/1956 | Miller ................................ 143/157–6 |
| 2,889,858 | 6/1959 | Roberts .............................. 143/46–55 |
| 3,550,653 | 12/1970 | Gauthier et al. ..................... 144/3 D |

Primary Examiner—Andrew R. Juhasz
Assistant Examiner—James F. Coan
Attorney—Darbo, Robertson & Vandenburgh

[57] ABSTRACT

In a bumper system suitable for stopping tree trunks fed lengthwise in positions for cutting successive equal lengths from the trunk, a bumper system is provided which absorbs tree trunk momentum by dissipation of energy and stops the tree trunk in position for sawing. Subsequent binding of the cut lengths between the face of the bumper and the saw is prevented by further receding movement of the bumper. Using a three-port cylinder, the impact moves the piston inward to expel hydraulic fluid through the intermediate port in series with a relief valve which provides resistive back pressure. At the predetermined correct measuring position, the piston closes this intermediate port, temporarily stopping the bumper and the tree trunk. During cutting, the more remote port is opened and oil is supplied to the near port to retract the bumper out of the way.

6 Claims, 1 Drawing Figure

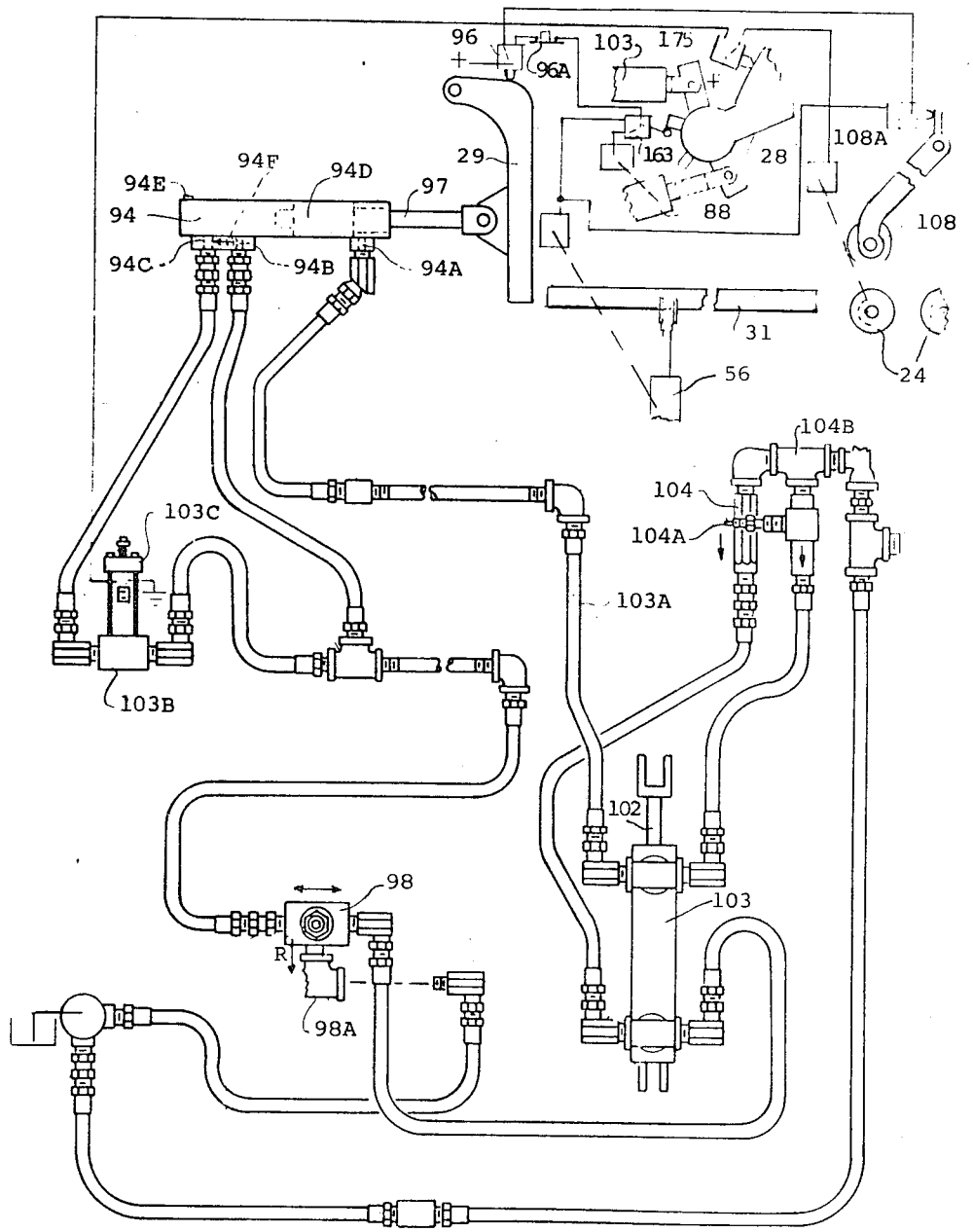

POSITIONING SYSTEM WITH BUMPER RECEDING FROM STOPPED POSITION

This application is related to application Ser. No. 658,703, filed Aug. 7, 1967, and now U.S. Pat. No. 3,550,653, the present applicant being one of the applicants of that application.

The invention of which this disclosure is offered for dissemination to the public in the event adequate patent protection is available, relates to an improvement of the tree-trunk sawing apparatus of that application, and especially to the bumper system for stopping a moving tree-trunk in that application.

In cutting successive lengths from a tree trunk, it is most efficient to feed the tree trunk longitudinally at a substantial speed, stop it quickly in the right position, cut off the length thus determined, eject that length and feed the remainder of the tree trunk again for another cycle. The moving tree trunk has substantial momentum. It is desirable to stop the tree trunk without excessive shock to the apparatus, and in a manner which eliminates danger of binding of the severed lengths between the stopping member and the saw. In the prior application, energy comprising the momentum was largely dissipated by the expelling of oil from a hydraulic cylinder actuated by the impact, a restricting valve causing substantial dissipation of energy as oil was expelled. When various factors were just right, the tree trunk would come to rest before the bumper had reached its limit of movement, and the bumper was relatively free of recede further if binding of the cut lengths between the bumper and the saw would otherwise result. The present invention provides an operation of this ideal type dependably, and under virtually all conditions, rather than uncertainly. The action is even improved as compared to that achieved before under ideal conditions, because the bumper is positively retracted so as not to exert even minor resistance to movement of the cut length, such as might by reaction thrust it toward the saw. Furthermore, the cut lengths are more accurately measured because the stopping point is more accurately predetermined than when the prior invention was operated in a manner to permit receding of the bumper after it had stopped the tree trunk.

An important element of achieving the present invention is a three-port cylinder in which the intermediate port substantially determines the point at which the tree trunk will be stopped. Until the tree trunk is stopped, the more remote port is closed by a valve. After the tree trunk has been stopped, this valve is opened automatically to permit the bumper to recede further and in the illustrated form it is positively retracted further.

THE DRAWINGS

The drawings comprise a single FIGURE which is mainly a piping diagram, but with key aspects of the circuit and cooperatively operating parts indicated diagrammatically.

GENERAL DESCRIPTION

For a general description of the apparatus and its operation, other than the improvements here described, reference is made to the prior application mentioned, the disclosure thereof being hereby incorporated by reference. Reference numerals used here are compatible.

For understanding the improvements, it is believed to be sufficient to say that the tree trunk is fed by a series of driven rollers represented in the present drawings by roller 24. The conveyor comprising these rollers feeds the log against a bumper 29. A bumper-actuated switch 96 causes the saw frame 28 to advance in a plane at the desired distance from the bumper 29, and this actuates limit switch 175 to stop the drive of conveyor 24. The axis about which saw frame 28 swings is of course parallel to the plane of the drawing instead of as shown. As the length of the tree trunk is cut off by the saw, it is caught by dump tray 31 which is then tilted to eject the length or log which has been cut from the tree trunk.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

IMPROVEMENT USING A THREE-PORT CYLINDER

As in the prior application, a substantially stationary cylinder 94 has its piston rod 97 connected to the bumper 29. According to the present improvement, however, the cylinder 94 is a three-port cylinder, having a head port 94A, an intermediate port 94B and a base port 94C. The piston 94D is an elongate piston so that once it is thrust far enough to the left to block port 94B it continues to block this port throughout its range of movement further to the left.

During impact of the tree trunk being fed against the bumper 29, the piston 94D expels oil through port 94B and through an adjustable valve 98 to a reservoir connection 98A. The valve 98 could be a mere restrictor valve, but it is preferably a relief valve, adjustable as to the pressure at which it will open to discharge into the return connection 98A.

As described in the prior application, a cylinder 103 has its piston 102 connected to the saw frame 28 to be moved by it. As illustrated here, piston 102 is moved outwardly, or extended, with respect to cylinder 103, by the advancing movement of saw frame 28. According to the present invention, oil thus expelled from cylinder 103 is delivered through piping 103A to head port 94A of cylinder 94, thereby applying hydraulic pressure to piston 94D to urge it to the left, for retracting the bumper 29 away from the end of the tree trunk. This leftward movement of piston 94D is now permitted by valve 103B which will now be open. Valve 103B is opened by solenoid 103C which is energized by limit switch 175 to open this valve when the saw frame 28 starts to move.

As in the prior application, the feeding of the saw frame 28 is initiated by a limit switch 96 actuated b a predetermined amount of initial movement of the bumper 29.

When the saw has completed its cut, it actuates limit switch 163. Limit switch 163 causes actuation of cylinder 56 to swing dump plate 31 so as to dump from it the severed length of the tree trunk. Limit switch 163 also causes reversal of the hydraulic connections to the cylinder controlling saw frame 28 so as to move it through its return stroke.

During the return stroke of saw frame 28, piston 102 forces hydraulic fluid from the base of cylinder 103 and into port 94C to restore stop 29 to its initial position. Valve 98 offers substantially no resistance to this flow, but prevents discharge to the oil reservoir until bumper 29 has reached its home position. The cylinder 103 pumps a considerable excess of oil over that required for actuation of cylinder 94, and this excess results in a buildup of pressure which operates relief valve 98 to enable the excess to escape to return line 98A.

In each direction of its operation the cylinder 103 can draw hydraulic fluid from the reservoir to keep the cylinder filled with oil. In the direction last described, this oil is drawn through restrictor valve 104A, where it has free flow in this direction. Cylinder 94 also draws oil through this valve during impact. As to flow in the opposite direction, during feed of the saw, the restrictor valve 104A maintains sufficient pressure to retract bumper 29. Restrictor valve 104A is adjustable to accomplish this reliably. It could also be a relief valve with free flow in one direction.

During the feed of the saw, hydraulic fluid is supplied to cylinder 103 through valve 104, which is a simple-check valve permitting free flow toward cylinder 103 but not through valve 104 in the opposite direction. Fitting 104B is connected to the reservoir for relatively free return of fluid to the reservoir and drawing fluid from the reservoir.

Although valve 103B has been shown connected to discharge fluid from cylinder 94 through relief valve 98, it could alternatively be connected to discharge directly to the return line 98A, provided that valve 103B is not opened before bumper 29 has stopped the tree trunk. It may also be mentioned that valve 103B could be bypassed by a relief valve which yields at much higher pressure than valve 98. Then, when valve 98 is set so that the smallest tree trunks commonly cut in the machine would move stop 29 to its measuring position at which its piston 94D obstructs port 94B, the larger trunks would cause the bumper to yield a little further while exerting great reaction.

It is important that any uncontrolled resilient return of bumper 29 be substantially avoided, so that it will return only when desired, after the cut is complete. Accordingly, an air-bleed screw 94E is provided at the top rear corner of cylinder 94. This could also be an automatic air-bleed device in the form of a floating ball valve. A ball of lighter density than the hydraulic fluid would close the port to the atmosphere when its chamber is filled with hydraulic fluid. It could also move to close a port leading to the cylinder 94 to prevent drawing of air into the cylinder 94 in the event that anyone should manually draw out a piston rod 97. In early experimental use of the present invention, which included use on two machines delivered commercially more than a year before the filing of this application, with unsatisfactory means for bleeding air, the inadequacy of air-bleed was found to be quite objectionable.

By providing manually controlled switching represented by switch 96A the advancing of the saw, the stopping of the conveyor 24 and the opening of valve 103B can be delayed until the operator decides these steps should begin. This is useful when tree trunks are thin enough so that more than one should be cut at a time. While the circuit is held open, as at 96A, lagging tree trunks may be advanced by conveyor 24 against bumper 29.

Switch 96 could directly control valve 103B, and could direct a supply of pressure fluid directly to port 94A, with a time delay. Control by saw frame 28 and using cylinder 103 automatically provide this delay. Also, if the saw is not up to speed, so that its governor delays advance of the saw, any lagging tree trunk may be advanced even without the operator's intervention.

A check valve 94F permits flow from port 94B to port 94C, but not in the opposite direction. This permits fluid to restore the piston 94D and bumper 29 even if valve 103B is closed. It would be especially important in the modification mentioned in which valve 103B is not in series with valve 98A but opens to the reservoir independently.

AUTOMATIC SHORT LENGTH EJECTION

The best mode of using the invention described above is in conjunction with another improvement over the prior application mentioned by which the last pieces of tree trunks, being too short to need cutting, are automatically ejected. To this end a holddown device 108 which is somewhat remotely pivoted and presses a log being fed firmly against the conveyor roller 24 nearest the saw, is provided with a limit switch 108A. This limit switch is in a circuit closed by limit switch 96 when bumper 29 is in its starting position. Thus if the last piece of a tree trunk passes out from under holddown device or roller 108, this roller will drop to a position to actuate switch 108A, and the circuit through limit switch 96 will be connected to the controls for eject cylinder 56 to tilt dump plate 31 and eject the last piece of the tree trunk. In the event that the last piece of the tree trunk should be long enough to let roller 108 drop, but still need cutting, its momentum would actuate bumper 29, interrupting the circuit just-mentioned at switch 96, so that the piece would not be ejected until after the completion of the cut.

ACHIEVEMENT

The present invention virtually eliminates binding of cut lengths between the bumper and the saw. At the same time it achieves high accuracy in the positioning of the tree trunk for sawing off a given length thereof. It may likewise be useful in any industry for stopping any heavy pieces which must be fed to a given position at substantial speed and then be unimpeded by the stopping means.

I claim:

1. A positioning apparatus for a saw mill having a driven conveyor for feeding to a bumper at substantial speed long heavy pieces to be cut, the conveyor normally being driven at full speed until drive is discontinued by action of the bumper in response to being struck, means for severing the pieces at a given distance from the bumper, a hydraulic cylinder-piston combination connected to the bumper to eject hydraulic fluid when the bumper is moved by the impact of the piece, and means to resist that discharge to dissipate energy and retard the piece;

said positioning apparatus including stop means effective after a given movement of the bumper by the piece to apply temporarily an abruptly increased resistance to further movement for stopping all heavy pieces before ultimate movement of the bumper is exhausted; and means actuated at least in part conjointly with an initial movement of the bumper by the piece to stop the drive of the conveyor; said stop means then being ineffective to prevent the bumper from receding further to substantially eliminate the danger of binding.

2. A positioning apparatus for a saw mill having a driven conveyor for feeding to a bumper at substantial speed long heavy pieces to be cut, the conveyor normally being driven at full speed until drive is discontinued by action of the bumper in response to being struck, means for severing the pieces at a given distance from the bumper, a hydraulic cylinder-piston combination connected to the bumper to eject hydraulic fluid when the bumper is moved by the impact of the piece, and means to resist that discharge to dissipate energy and retard the piece;

said positioning apparatus including stop means effective after a given movement of the bumper by the piece to apply temporarily an abruptly increased resistance to further movement for stopping all heavy pieces before ultimate movement of the bumper is exhausted; and means actuated at least in part conjointly with an initial movement of the bumper by the piece to stop the drive of the conveyor; said stop means then being ineffective to prevent the bumper from receding further to substantially eliminate the danger of binding; and means for retracting the bumper from the piece.

3. A positioning apparatus for a saw mill having a driven conveyor for feeding to a bumper at substantial speed long heavy pieces to be cut, the conveyor normally being driven at full speed until drive is discontinued by action of the bumper in response to being struck, means for severing the pieces at a given distance from the bumper, a hydraulic cylinder-piston combination connected to the bumper to eject hydraulic fluid when the bumper is moved by the impact of the piece, and means to resist that discharge to dissipate energy and retard the piece;

said positioning apparatus including stop means effective after a given movement of the bumper by the piece to apply temporarily an abruptly increased resistance to further movement for stopping all heavy pieces before ultimate movement of the bumper is exhausted;

means actuated at least in part conjointly with an initial movement of the bumper by the piece to stop the drive of the conveyor; said stop means then being ineffective to prevent the bumper from receding further to substantially eliminate the danger of binding; and a hydraulic chamber means operated with the advance and retraction of the severing means to extrude oil to operate the cylinder-piston means to retract the bumper after impact and to restore it after the piece is severed.

4. A positioning apparatus having a driven conveyor for feeding to a bumper at substantial speed heavy pieces, the conveyor normally being driven at full speed until drive is discontinued by action of the bumper in response to being struck, a hydraulic cylinder-piston combination connected to the bumper to discharge hydraulic fluid when the bumper is moved by the impact of the piece, and means to resist that discharge to dissipate energy and retard the piece;

said positioning apparatus including stop means effective after a given movement of the bumper by the piece to apply temporarily an abruptly increased resistance to further movement for stopping all heavy pieces before ultimate movement of the bumper is exhausted, and means actuated at least in part correlatedly with an initial movement of the bumper by the piece to stop the drive of the conveyor; said stop means then being ineffective to prevent the bumper from receding further to substantially eliminate the danger of binding as the piece moves subsequently.

5. A positioning apparatus having a driven conveyor for feeding to a bumper at substantial speed heavy pieces, the conveyor normally being driven at full speed until drive is discontinued by action of the bumper in response to being struck, a hydraulic cylinder-piston combination connected to the bumper to eject hydraulic fluid when the bumper is moved by the impact of the piece, and means to resist that discharge to dissipate energy and retard the piece;

said positioning apparatus including stop means effective after a given movement of the bumper by the piece to apply temporarily an abruptly increased resistance to further movement for stopping all heavy pieces before ultimate movement of the bumper is exhausted; and means actuated at least in part correlatedly with an initial movement of the bumper by the piece to stop the drive of the conveyor; said stop means then being ineffective to prevent the bumper from receding further to substantially eliminate the danger of binding; and means for retracting the bumper from the piece.

6. A positioning apparatus for a saw mill having a driven conveyor feeding to a bumper at substantial speed long heavy pieces to be cut, means for severing the pieces at a given distance from the bumper, a hydraulic cylinder-piston combination connected to the bumper to eject hydraulic fluid when the bumper is moved by the impact of the piece, and means to resist that discharge to dissipate energy and retard the piece;

said cylinder having an intermediate port leading to said means to resist and closed by the piston to serve, jointly with means temporarily limiting expulsion of fluid from an end port, as stop means effective after a given movement of the bumper b the piece to apply temporarily increased resistance to further movement before ultimate movement of the bumper is exhausted; and means actuated at least in part conjointly with an initial movement of the bumper by the piece to stop the drive of the conveyor; said means for limiting thereafter being ineffective to prevent the bumper from receding further to substantially eliminate the danger of binding.

* * * * *